United States Patent
Miyake (10) Patent No.: US 11,106,194 B2
(45) Date of Patent: Aug. 31, 2021

(54) NUMERICAL CONTROLLER FOR CONTINUOUS CUTTING CONTROL

(71) Applicant: Fanuc Corporation, Yamanashi (JP)

(72) Inventor: Masahiko Miyake, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/815,425

(22) Filed: Mar. 11, 2020

(65) Prior Publication Data

US 2020/0319620 A1 Oct. 8, 2020

(30) Foreign Application Priority Data

Apr. 3, 2019 (JP) .............................. JP2019-071659

(51) Int. Cl.
*G05B 19/4103* (2006.01)
*G05B 19/414* (2006.01)
*G05B 19/18* (2006.01)

(52) U.S. Cl.
CPC ....... *G05B 19/4103* (2013.01); *G05B 19/182* (2013.01); *G05B 19/4141* (2013.01)

(58) Field of Classification Search
None
See application file for complete search history.

(56) References Cited

U.S. PATENT DOCUMENTS

| 10,108,170 | B2* | 10/2018 | Nakajima | G05B 19/188 |
| 2011/0287693 | A1 | 11/2011 | Hosokawa et al. | |
| 2017/0075337 | A1 | 3/2017 | Kameta et al. | |
| 2018/0257192 | A1 | 9/2018 | Nakaya et al. | |
| 2018/0329391 | A1* | 11/2018 | Sasaki | G05B 19/19 |

FOREIGN PATENT DOCUMENTS

| JP | 2011248473 A | 12/2011 |
| JP | 2017056515 A | 3/2017 |
| WO | 2017051745 A1 | 3/2017 |

* cited by examiner

*Primary Examiner* — Ryan A Jarrett
(74) *Attorney, Agent, or Firm* — RatnerPrestia (57) ABSTRACT

A numerical controller configured for simultaneous control such as to cut a workpiece in order in the direction of a rotary axis by a plurality of tools, in a machine having a plurality of cutter holders fitted individually with the tools and capable of lathe turning, generates movement command data for locating the plurality of tools so as to cut the workpiece with the same depth of cut and controlling respective relative speeds and relative positions of the plurality of tools so that respective cutting points of the tools move back and forth in order; generates interpolation data based on the movement command data; and controls a motor for driving the machine, based on the interpolation data.

3 Claims, 6 Drawing Sheets

NUMERICAL CONTROLLER FOR CONTINUOUS CUTTING CONTROL

RELATED APPLICATION

The present application claims priority to Japanese Patent Application Number 2019-071659 filed on Apr. 3, 2019, the disclosure of which is hereby incorporated by reference herein in its entirety.

BACKGROUND OF THE INVENTION

Field of the Invention

The present invention relates to a numerical controller, and more particularly, to a numerical controller for controlling a lathe machine tool configured to machine a workpiece in cooperation with a plurality of tools.

Description of the Related Art

Usually, lathe turning involves continuous cutting, so that a chip generated by the cutting is long and continuous. This chip may possibly twine itself around a tool or a workpiece, thereby damaging the tool or marring the workpiece. Accordingly, there have been provided a chip breaking function configured to break chips by temporarily feeding the tool in the reverse direction in the middle of the continuous cutting and an oscillation cutting function configured to break chips by oscillating the tool for machining. Devices having these functions are disclosed in, for example, Japanese Patent Applications Laid-Open Nos. 2011-248473 and 2017-056515 and International Publication No. 2017/051745.

Because the chip breaking function configured to break chips by temporarily feeding the tool in the reverse direction entails a non-cutting time, it requires a longer cutting time than in normal cutting. Moreover, in the case of oscillation cutting, if the oscillation amplitude and oscillation frequency increase, vibrations become higher than in a non-oscillating state, thereby causing an increase in mechanical load. Possibly, therefore, the machine life (of ball screws, bearings, etc.) and tool life may be adversely affected. In order to suppress the oscillation amplitude and oscillation frequency, it is necessary to reduce the feed speed, so that the machining time becomes longer than in the normal cutting.

Accordingly, there is a demand for a technology for breaking cut chips without entailing an increase in machining time or expiration of the machine or tool life.

SUMMARY OF THE INVENTION

A numerical controller according to one aspect of the present invention solves the above problems by controlling the respective relative speeds and positions of a plurality of tools so that chips can be divided, in such a machining method that cutting is performed by a machine configured to simultaneously control the plurality of tools.

More specifically, during continuous cutting by a first tool the speeds and positions are controlled so as to advance a second tool to a position ahead of a first cutting point. Thereupon, the first tool is non-cutting and does not perform cutting while the second tool is located ahead of the first tool. A chip generated by the cutting of the first tool is broken when the first tool in a cutting state is rendered non-cutting.

Subsequently, when the chip generated by the first tool is broken, the speeds and positions are controlled so that the second tool is located behind the first tool, on the contrary, this time. The second tool is non-cutting and does not perform cutting while the first tool is located ahead of the second tool. A chip generated by the cutting of the second tool is broken when the second tool in a cutting state is rendered non-cutting. Thus, chips are broken by controlling the relative speeds and positions so as to alternately shift the respective cutting points of the first and second tools back and forth.

The one aspect of the present invention is a numerical controller configured for simultaneous control such as to cut a workpiece in order in the direction of a rotary axis by a plurality of tools, in a machine having a plurality of cutter holders fitted individually with the tools and capable of lathe turning, the numerical controller including an analyzer configured to generate movement command data for locating the plurality of tools so as to cut the workpiece with the same depth of cut and controlling the respective relative speeds and relative positions of the plurality of tools so that the respective cutting points of the tools move back and forth in order; an interpolator configured to generate interpolation data based on the movement command data; and a servo controller configured to control a motor for driving the machine, based on the interpolation data.

According to the present invention, cut chips can be broken without entailing an increase in machining time or expiration of the machine or tool life.

BRIEF DESCRIPTION OF THE DRAWINGS

The above and other objects and features of the present invention will be apparent from the ensuing description of embodiments with reference to the accompanying drawings, in which.

DETAILED DESCRIPTION OF THE PREFERRED EMBODIMENTS

Some embodiments of the present invention will now be described with reference to the accompanying drawings.

Figure 1:
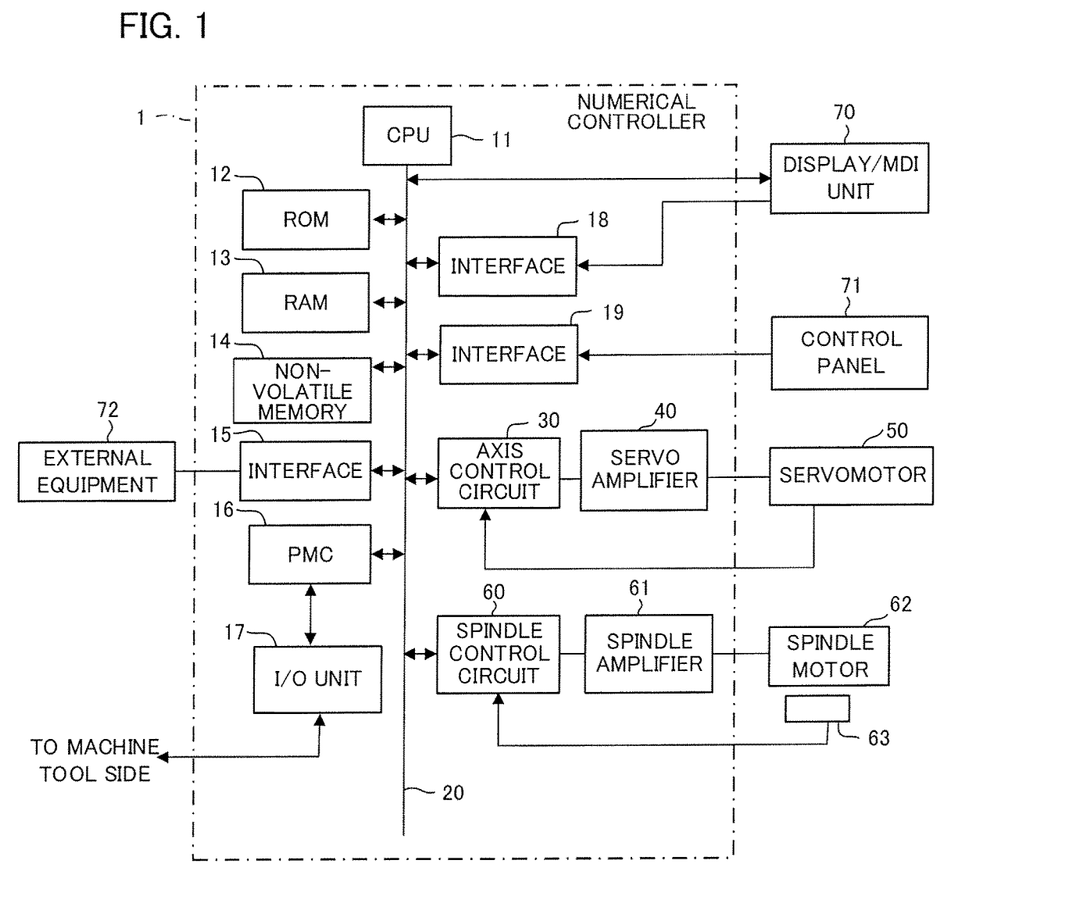
FIG. 1 is a schematic hardware configuration diagram of one embodiment of a numerical controller according to the present invention.

FIG. 1 is a schematic hardware configuration diagram showing principal parts of one embodiment of a numerical controller according to the present invention. A numerical controller 1 according to the present embodiment can be mounted on a lathe machine tool, for example, as a numerical controller for controlling the lathe machine tool based on a program.

The numerical controller 1 includes a CPU (central processing unit) 11, a ROM (read-only memory) 12, a RAM (random access memory) 13, and a non-volatile memory 14. The numerical controller 1 further includes an interface 15, a PMC (programmable machine controller) 16, an I/O unit (input/output unit) 17, and additional interfaces 18 and 19. The numerical controller 1 is further connected with a spindle motor 62, a display/MDI (manual data input) unit 70, and a control panel 71.

The CPU 11 of the numerical controller 1 according to the present embodiment is a processor for generally controlling the numerical controller 1. The CPU 11 reads out a system program stored in the ROM 12 via a bus 20 and controls the entire numerical controller 1 according to this system program. The RAM 13 is temporarily loaded with temporary calculation data and display data, various externally input data and the like.

The non-volatile memory 14 is composed of, for example, a memory, SSD (solid state drive) or the like, which is backed up by a battery (not shown), so that its storage state can be maintained even when the numerical controller 1 is switched off. The non-volatile memory 14 is stored with programs read from external equipment 72 via the interface 15, program input through the display/MDI unit 70 and other programs. The programs and the various data stored in the non-volatile memory 14 may be developed in the RAM 13 during execution and use. Moreover, various system programs, such as a conventional analysis program, are previously written in the ROM 12.

The interface 15 is one for connecting the CPU 11 in the numerical controller 1 with the external equipment 72 such as a USB device. A program and various parameters used for the control of the lathe machine tool are read from the side of the external equipment 72. Moreover, the program, various parameters and the like, which are edited in the numerical controller 1, can be stored into an external storage means through the external equipment 72. The PMC (programmable machine controller) 16 controls the lathe machine tool and its peripheral devices by outputting signals to them through the I/O unit 17 according to a sequence program built in the numerical controller 1. The peripheral devices to which these signals are output may include a tool changer, an actuator such as a robot and sensors attached to the lathe machine tool. Furthermore, when signals are received from various switches on a control panel on the main body of the lathe machine tool and the peripheral devices, they are subjected to necessary signal processing and then delivered to the CPU 11.

The display/MDI unit 70 is a manual data input device equipped with a display, keyboard and the like. The interface 18 receives commands and data from the keyboard of the display/MDI unit 70 and delivers them to the CPU 11. The interface 19 is connected to the control panel 71 equipped with a manual pulse generator or similar device used in manually driving individual axes.

An axis control circuit 30 for controlling the axes of the lathe machine tool receives a movement command amount for each axis from the CPU 11 and outputs a command for the axis to a servo amplifier 40. On receiving this command, the servo amplifier 40 drives a servomotor 50 for moving the axes of the lathe machine tool. The axis servomotor 50 has a position/speed detector built-in. A position/speed feedback signal from this position/speed detector is fed back to the axis control circuit 30. Thereby, the axis control circuit 30 performs position/speed feedback control. In the hardware configuration diagram of FIG. 1, the axis control circuit 30, servo amplifier 40 and servomotor 50 are each shown as being only one in number. Actually, however, these elements are provided corresponding in number to the axes of the lathe machine tool to be controlled. In controlling the lathe machine tool provided with two cutter holders as the present invention, for example, the numerical controller 1 and the lathe machine tool prepares two sets of the axis control circuit 30, servo amplifier 40 and servomotor 50 for individually driving a first cutter holder fitted with a first tool in the X-axis and the Z-axis direction and other two sets of the axis control circuit 30, servo amplifier 40 and servomotor 50 for individually driving a second cutter holder fitted with a second tool in the X-axis and Z-axis direction.

On receiving a spindle rotation command, a spindle control circuit 60 outputs a spindle speed signal to a spindle amplifier 61. On receiving this spindle speed signal, the spindle amplifier 61 rotates a spindle motor 62 in the lathe machine tool at a commanded rotational speed, thereby driving a tool. The spindle motor 62 is connected with a position coder 63. The position coder 63 outputs feedback pulses to the spindle control circuit 60 in synchronism with the rotation of the spindle. The feedback pulses output to the circuit 60 are read by the CPU 11.

Figure 2:
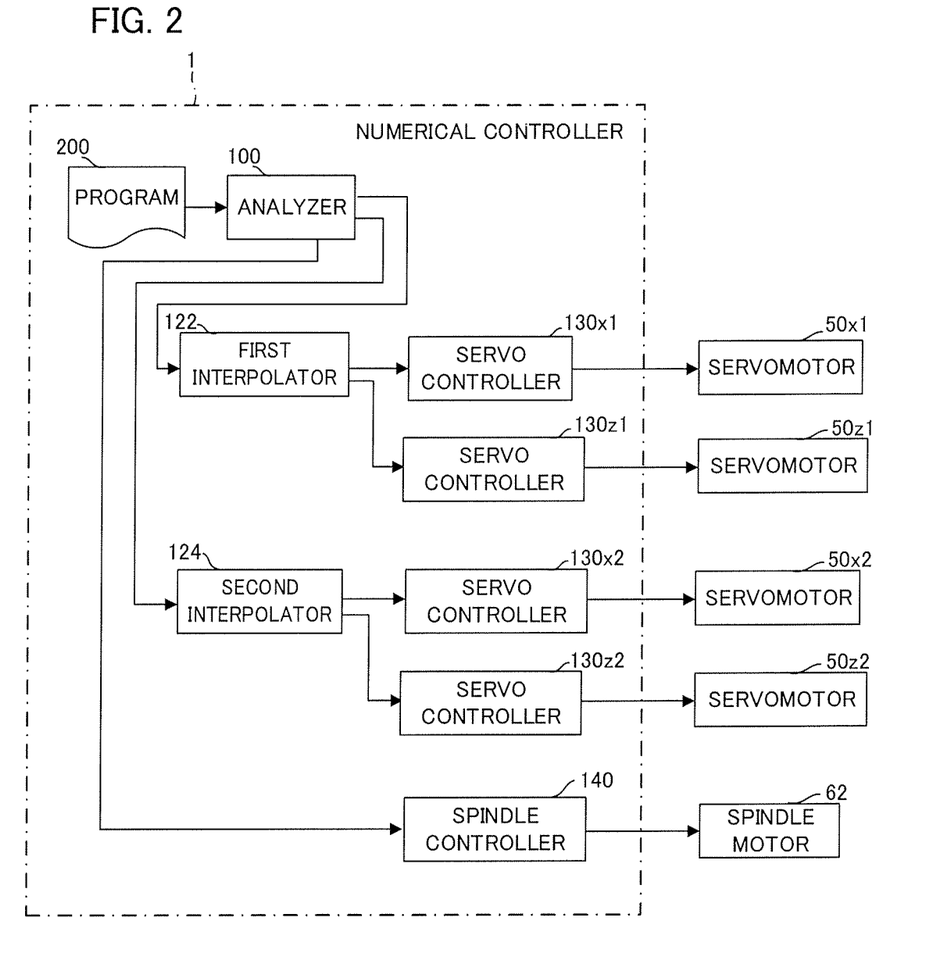
FIG. 2 is a schematic functional block diagram of the one embodiment of the numerical controller according to the present invention.

FIG. 2 is a schematic functional block diagram of the numerical controller 1 according to the one embodiment of the present invention.

Each functional block shown in FIG. 2 is actualized by the CPU 11 in the numerical controller 1 shown in FIG. 1 executing the system program and controlling the operation of each component in the numerical controller 1. The numerical controller 1 of the present embodiment controls a lathe turning machine configured to machine a workpiece mounted on the spindle by individually driving a first cutter holder fitted with a first tool and a second cutter holder fitted with a second tool.

The numerical controller 1 of the present embodiment includes an analyzer 100, a first interpolator 122, a second interpolator 124, servo controllers 130$x$1, 130$z$1, 130$x$2 and 130$z$2 and a spindle controller 140. The non-volatile memory 14 in the numerical controller 1 previously stores a program 200 for driving the tools mounted on the two cutter holders to perform control for the workpiece machining.

The analyzer 100 is actualized by the system program read out from the ROM 12 by the CPU 11 in the numerical controller 1 shown in FIG. 1 being executed and by a computation processing being performed mainly by the CPU 11 using the RAM 13 and the non-volatile memory 14. The analyzer 100 is regarded as functional means configured to read out and analyze blocks of the program 200 and generate movement command data for servomotors for driving the first and the second cutter holder and spindle command data for commanding the rotational frequency of the spindle.

Based on feed commands from the blocks of the program 200, the analyzer 100 generates movement command data for servomotors 50x1 and 50z1 for driving the first cutter holder and movement command data for servomotors 50x2 and 50z2 for driving the second cutter holder. Moreover, the analyzer 100 generates the spindle command data based on spindle rotation commands from the blocks of the program 200.

The analyzer 100 in the present embodiment generates the movement command data when the workpiece machining is started. More specifically, the analyzer 100 generates the movement command data so as to locate the Z-axis coordinate value of the first and the second cutter holder so that the depth of cut in the workpiece by the first tool mounted on the first cutter holder and the depth of cut in the workpiece by the second tool mounted on the second cutter holder have respective values commanded by the program 200 or set in advance. Furthermore, the analyzer 100 generates Z-axis-direction movement command data such that the relative speed between the respective Z-axis-direction feed speeds of the first and the second cutter holder is adjusted so that the first and second tools are positioned to alternately machine the workpiece.

The first interpolator 122 and the second interpolator 124 are actualized by the system program read out from the ROM 12 by the CPU 11 in the numerical controller 1 shown in FIG. 1 being executed and by the computation processing being performed mainly by the CPU 11 using the RAM 13 and the non-volatile memory 14.

Based on the movement command data generated by the analyzer 100, the first interpolator 122 generates interpolation data such that points on the command path of the first tool mounted on the first cutter holder commanded by the movement command data are interpolation-calculated in an interpolation cycle (control cycle). Moreover, based on the movement command data generated by the analyzer 100, the second interpolator 124 generates interpolation data such that points on the command path of the second tool mounted on the second cutter holder commanded by the movement command data are interpolation-calculated in the interpolation cycle. Interpolation processing by the first interpolator 122 and the second interpolator 124 is executed with every interpolation cycle.

The servo controllers 130x1 and 130z1 are actualized by the execution of the system program read out from the ROM 12 by the CPU 11 of the numerical controller 1 shown in FIG. 1, the computation processing mainly by the CPU 11 using the RAM 13 and the non-volatile memory 14 and the control processing of the servomotor 50 by the data axis control circuit 30 and the servo amplifier 40. Based on the interpolation data generated by the first interpolator 122, the servo controllers 130x1 and 130z1 control the respective servomotors 50x1 and 50z1 for driving the first cutter holder in the X-axis and the Z-axis direction, respectively. In this way, the servo controllers 130x1 and 130z1 drive the first cutter holder of the machine to be controlled.

Likewise, the servo controllers 130x2 and 130z2 are actualized as the execution of the system program read out from the ROM 12 by the CPU 11, the computation processing mainly by the CPU 11 using the RAM 13 and the non-volatile memory 14 and the control processing of the servomotor 50 by the axis control circuit 30 and the servo amplifier 40. Based on the interpolation data generated by the second interpolator 124, the servo controllers 130x2 and 130z2 control the respective servomotors 50x2 and 50z2 for driving the first cutter holder in the X-axis and the Z-axis direction, respectively. In this way, the servo controllers 130x2 and 130z2 drive the second cutter holder of the machine to be controlled.

The spindle controller 140 is actualized by the execution of the system program read out from the ROM 12 by the CPU 11 of the numerical controller 1 shown in FIG. 1, the computation processing mainly by the CPU 11 using the RAM 13 and the non-volatile memory 14 and the control processing of the spindle motor 62 by the spindle control circuit 60 and the spindle amplifier 61. Based on the spindle command data generated by the analyzer 100, the spindle controller 140 controls the spindle motor 62 that rotates the spindle of the machine to be controlled.

Figure 3A:
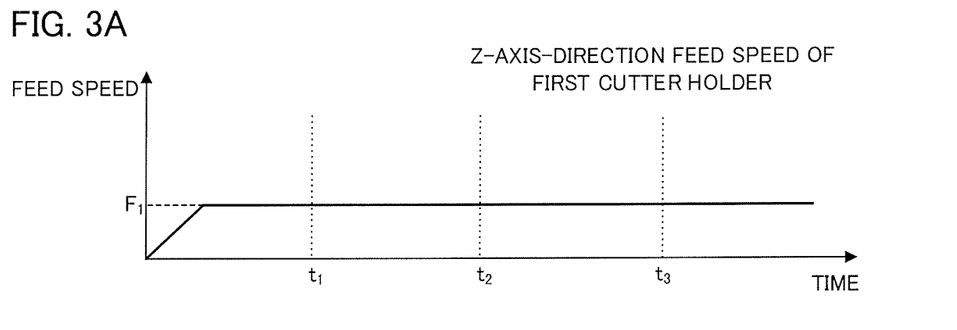
FIGS. 3A and 3B are diagrams illustrating transitions of moving speeds of a first and a second cutter holder in the Z-axis direction based on movement command data generated by an analyzer.
Figure 3B:
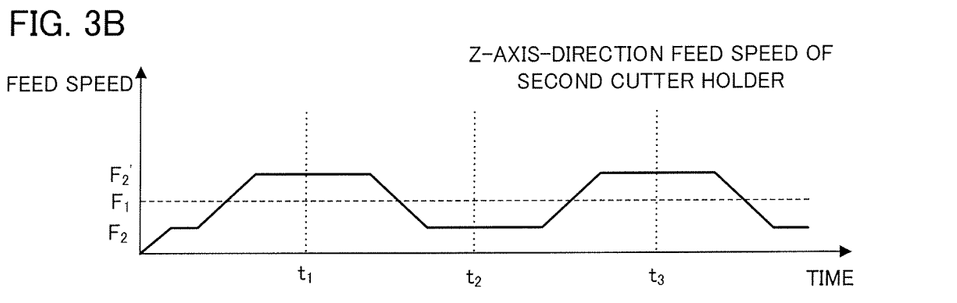

FIGS. 3A and 3B are diagrams showing an example of transitions of the moving speed of the first and the second cutter holder in the Z-axis direction based on the movement command data generated by the analyzer 100. In this speed transition example, as shown in FIG. 3A, the Z-axis-direction feed speed of a first cutter holder 3 is always $F_1$ except during acceleration and deceleration at the start and end of movement. In this example, as shown in FIG. 3B, the relative speed between the respective Z-axis-direction feed speeds of the first and the second cutter holder is adjusted by varying the Z-axis-direction feed speed of the second cutter holder between $F_2$ (<$F_1$) and $F_2'$ (> $F_1$).

If the speeds are adjusted in the manner shown in FIGS. 3A and 3B, the first tool mounted on the first cutter holder that moves at the speed $F_1$ (> $F_2$) first cuts the workpiece ahead of the second tool mounted on the second cutter holder. When the speed of the second cutter holder increases from $F_2$ to $F_2'$ (> $F_1$) in the middle, the second tool mounted on the second cutter holder catches up the first tool mounted on the first cutter holder at time $t_1$. Thereafter, the second tool mounted on the second cutter holder cuts the workpiece ahead of the first tool mounted on the first cutter holder. When the speed of the second cutter holder is then reduced from $F_2'$ to $F_2$ (<$F_1$), the second tool mounted on the second cutter holder is caught up by the first tool mounted on the first cutter holder. Thereafter, the first tool mounted on the first cutter holder cuts the workpiece ahead of the second tool mounted on the second cutter holder.

By repeating this speed adjustment, the respective relative positions of the first tool mounted on the first cutter holder and the second tool mounted on the second cutter holder are adjusted so that the tools can alternately machine the workpiece. The analyzer 100 in the present invention generates the movement command data for adjustment such that the respective feed speeds of the first and the second cutter holder undergo the speed transitions illustrated in FIGS. 3A and 3B.

Figure 4:
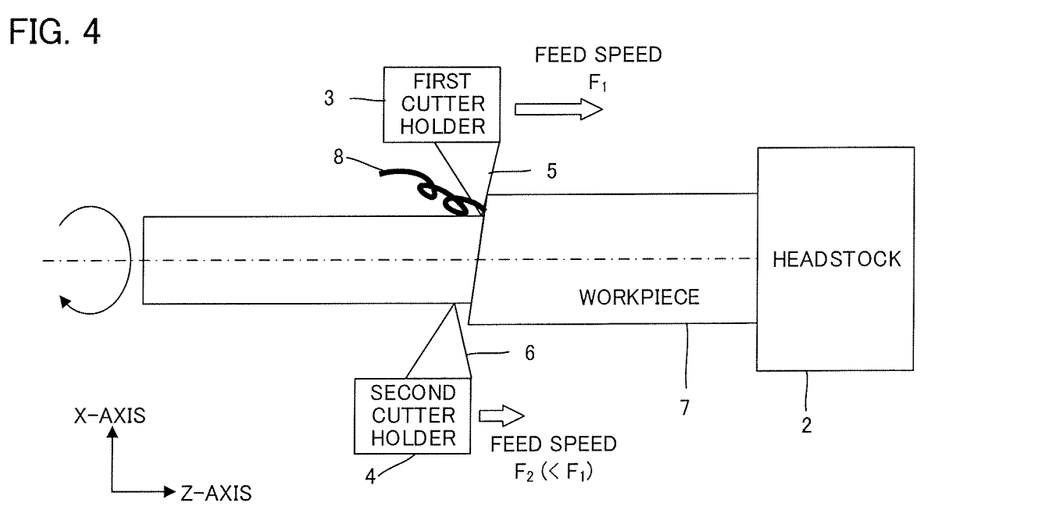
FIG. 4 is a diagram showing a positional relationship between a workpiece and respective tools in the case where a first tool mounted on the first cutter holder is in a position ahead of a second tool mounted on the second cutter holder.
Figure 5:
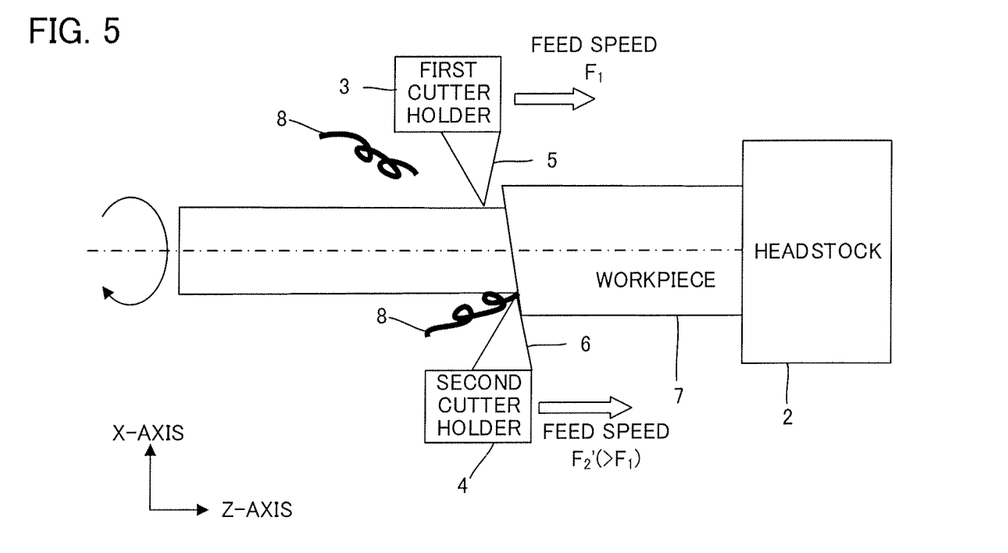
FIG. 5 is a diagram showing a positional relationship between the workpiece and the respective tools in the case where the second tool mounted on the second cutter holder is in a position ahead of the first tool mounted on the first cutter holder.
Figure 6:
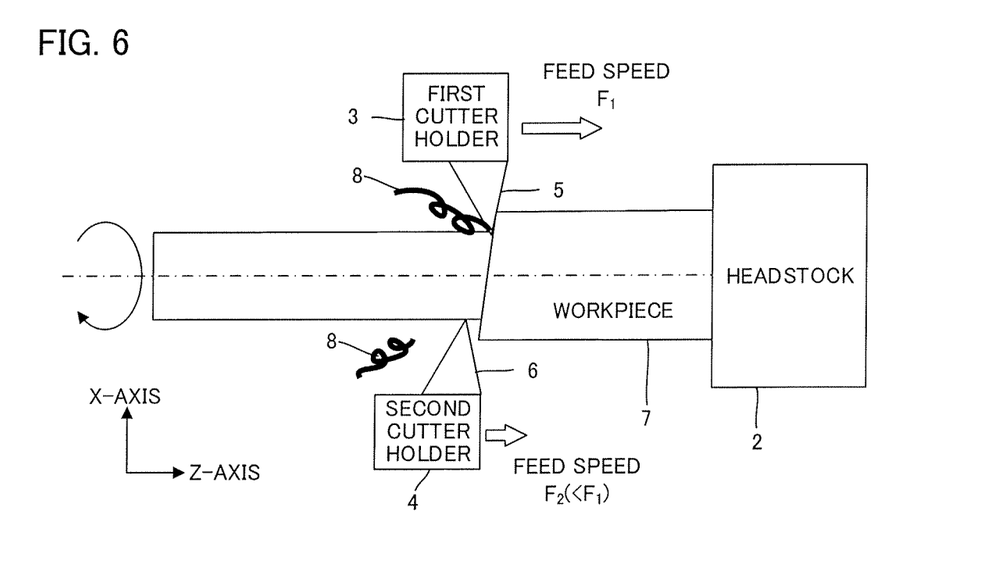
FIG. 6 is a diagram showing a positional relationship between the workpiece and the respective tools in the case where the first tool mounted on the first cutter holder is in a position ahead of the second tool mounted on the second cutter holder.

Referring to FIGS. 4 to 6, there will be described machining of a workpiece 7 by a first tool 5 mounted on the first cutter holder 3 and a second tool 6 mounted on the second cutter holder 4 performed when the individual cutter holders are moved according to the speed transitions illustrated in FIG. 3. In the machining examples shown in these drawings, the workpiece 7 is mounted on a machine tool 2, and more specifically, on the headstock of the machine tool 2.

FIG. 4 is a diagram showing a positional relationship between the workpiece 7 and the tools in the case where the first tool 5 mounted on the first cutter holder 3 is in a position (time 0 to time $t_1$ in FIG. 3) ahead of the second tool 6 mounted on the second cutter holder 4. In the state shown in FIG. 4, the Z-axis-direction feed speed of the second cutter holder 4 is $F_2$ (<$F_1$). In this state, the workpiece 7 is cut by the first tool 5 and a chip 8 is generated from the machining position. Thereafter, the Z-axis-direction feed speed of the second cutter holder 4 is accelerated to $F_2'$ ($> F_1$). When the second tool 6 mounted on the second cutter holder 4 gets ahead of the first tool 5 mounted on the first cutter holder 3 and the workpiece 7 starts to be cut by the second tool 6, the first tool 5 is rendered non-cutting and the chip 8 having been generated by the cutting work of the first tool 5 is broken.

FIG. 5 is a diagram showing a positional relationship between the workpiece 7 and the tools in the case where the second tool 6 mounted on the second cutter holder 4 is in a position (time $t_1$ to $t_2$ in FIG. 3) ahead of the first tool 5 mounted on the first cutter holder 3. In the state shown in FIG. 5, the Z-axis-direction feed speed of the second cutter holder 4 is $F_2'$ ($> F_1$). In this state, the workpiece 7 is cut by the second tool 6 and the chip 8 is generated from the machining position. Thereafter, the Z-axis-direction feed speed of the second cutter holder 4 is decelerated to $F_2$ ($<F_1$). When the first tool 5 mounted on the first cutter holder 3 gets ahead of the second tool 6 mounted on the second cutter holder 4 and the workpiece 7 starts to be cut by the first tool 5, the second tool 6 is rendered non-cutting and the chip 8 having been generated by the cutting work of the second tool 6 is broken.

FIG. 6 is a diagram showing positional relationship between the workpiece 7 and the tools in the case where the first tool 5 mounted on the first cutter holder 3 is in a position (time $t_2$ to $t_3$ in FIG. 3) ahead of the second tool 6 mounted on the second cutter holder 4. In the state shown in FIG. 6, the Z-axis-direction feed speed of the second cutter holder 4 is $F_2$ ($<F_1$). In this state, the workpiece 7 is cut by the first tool 5 and the chip 8 is generated from the machining position.

Thus, in the lathe turning machine controlled by the numerical controller 1 according to the present embodiment, the state in which either the first tool 5 or the second tool 6 is always performing the cutting work is maintained by repeatedly adjusting the respective relative speeds of the first cutter holder 3 on which the first tool 5 is mounted and the second cutter holder 4 on which the second tool 6 is mounted. Moreover, a state in which the first tool 5 and the second tool 6 alternately perform the cutting work can be created. Consequently, while chips can be broken as the states of the cutting work of the first tool 5 and the second tool 6 can be switched to be alternately rendered non-cutting, the workpiece 7 can always be kept ready for cutting. Therefore, there is no non-cutting time, and the machining time is similar to the time in normal continuous cutting.

Furthermore, in the lathe turning machine controlled by the numerical controller 1 according to the present embodiment, the respective advancing directions of the individual tools are fixed and need not be reversed unlike in the case of the oscillation cutting. The tool to be used in cutting should be changed only when the chip 8 is expected to be broken. Therefore, vibrations can be suppressed to lower levels than in the oscillation cutting, so that the machine life (of ball screws, bearings, etc.) and tool life are less influenced.

In the lathe turning machine controlled by the numerical controller 1 according to the present embodiment, the individual tools are alternately rendered non-cutting, so that they can be fully cooled by a coolant. Therefore, the tool life can be extended and the workpiece machined surface quality can be improved.

In the lathe turning machine controlled by the numerical controller 1 according to the present embodiment, the first and second tools 5 and 6 cut the workpiece 7 in the same, conditions. Therefore, when the material of the workpiece 7 is changed, each cutter holder should only move back and forth relative to the other-side cutter holder even if a cutting condition or conditions, such as the depth of cut, rotational frequency of the spindle and feed speed, are changed. Accordingly, readjustment of each tool is unnecessary, so that the adjustment is not troublesome.

While an embodiment of the present invention has been described above, the invention is not limited to the above-described embodiment and may be suitably modified and embodied in various forms.

Figure 7A:
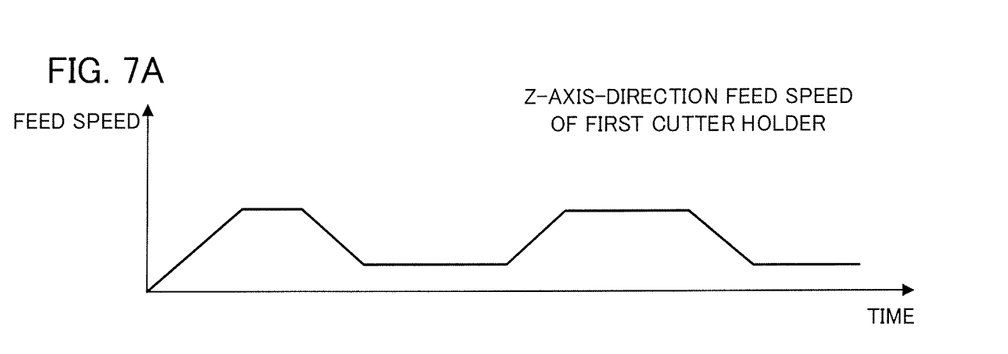
FIGS. 7A and 7B are diagrams showing another example of the transitions of the moving speed of the first and the second cutter holder in the Z-axis direction.
Figure 7B:
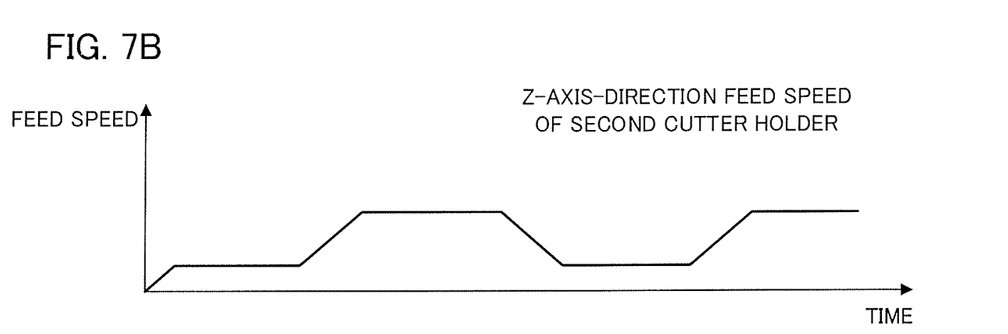
Figure 8A:
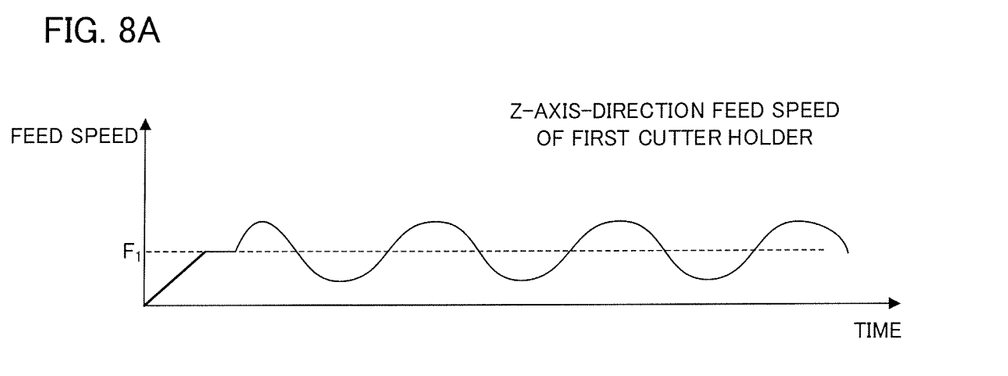
FIGS. 8A and 8B are diagrams showing another example of the transitions of the moving speed of the first and the second cutter holder in the Z-axis direction.
Figure 8B:
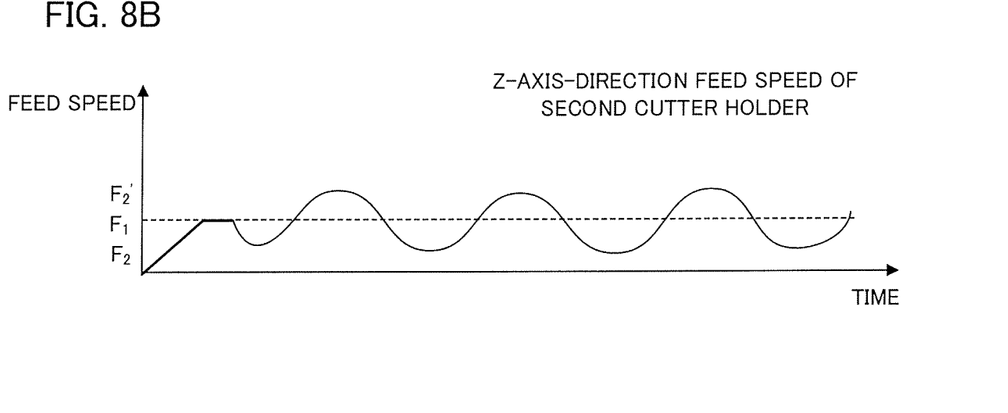

In the embodiment described above, the relative speed between the respective moving speeds of the first tool 5 and the second tool 6 is altered by changing the speed of the second tool 6 with the speed of the first tool 5 fixed. As illustrated in FIGS. 7A and 7B, however, control may be made so that the respective relative positions of the first tool 5 and the second tool 6 are alternately shifted back and forth by changing the speeds of, both the first and second tools 5 and 6. Moreover, as illustrated in FIGS. 8A and 8B, the respective speed transitions of the first and the second tool 5, 6 may be delineated based on curves such as sine curves. During such control, it is preferable that the speeds are changed so that the sum of the respective speeds of the first and the second cutter holder 3, 4 is constant. If the speeds are changed in this manner, the respective depths of cut by the first and the second tool 5, 6 per unit time can be easily made constant. In addition, it is possible to reduce the fluctuation of loads on the tools and the workpiece for stability and mitigate vibrations that are generated during machining. Thus, the workpiece machined surface quality can be improved with ease.

Moreover, depending on the cutting distance and cutting time of the tools and the rotational frequency (number of laps of the cutting work) of the spindle, control may be made so that the respective relative positions of the first tool 5 and the second tool 6 are alternately shifted back and forth. The X-coordinate position of each tool at predetermined time t since the start of cutting can be calculated as an integral value in the time-feed speed graph of each drawing. Therefore, it is necessary only that the cutting distance, spindle rotational frequency and the like be obtained based on the thus calculated integral value and that the speed be adjusted so that the first tool 5 and the second tool 6 alternately perform cutting according to the obtained cutting distance.

Figure 9:
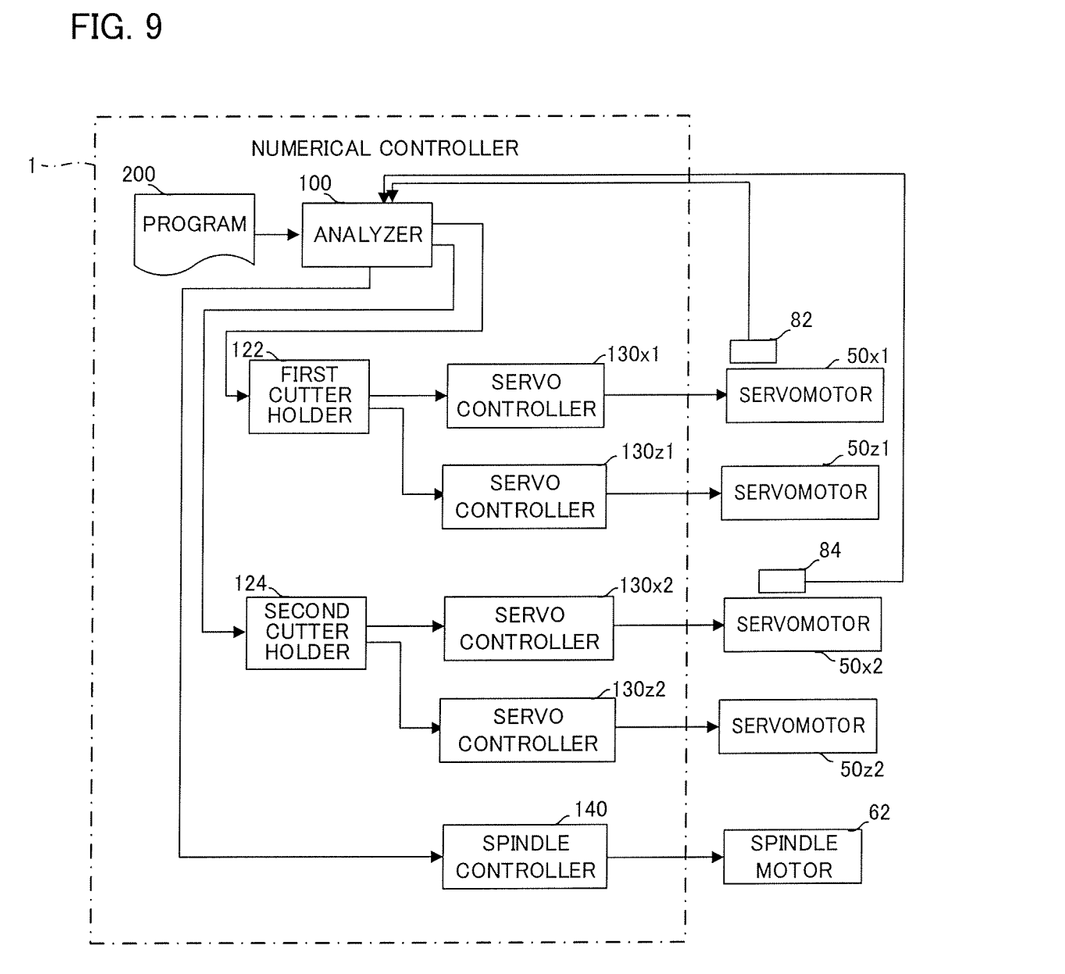
FIG. 9 is a schematic functional block diagram of another embodiment of the numerical controller.

Furthermore, as shown in FIG. 9, vibration sensors 82 and 84 may be previously installed on the servomotors 50$x$1 and 50$x$2, respectively. Moreover, the analyzer 100 may be configured to integrate the amplitude value of a vibration detected by the vibration sensor mounted on the servomotor 50 for moving the tool that is cutting the workpiece, for each predetermined cycle. Based on this configuration, the analyzer 100 may be configured to generate movement command data for adjusting the respective relative speeds and relative positions of the first and second tools 5 and 6 so that the tool in the cutting state is rendered non-cutting when a predetermined threshold is exceeded by the resulting integrated value. The analyzer 100 may also be configured to integrate, instead of the value detected by the vibration sensor 82 or 84, the load value of the servomotor 50 for moving the tool in the workpiece cutting state, which is estimated from the current value of the servomotor 50 concerned. Based on this configuration, the analyzer 100 may be configured to generate movement command data for adjusting the respective relative speeds and relative positions of the first tool 5 and the second tool 6 so that the tool in the cutting state is rendered non-cutting when a predetermined threshold is exceeded by the resulting integrated value.

In the embodiment described above, the lathe turning machine is supposed to be arranged so that the positions of the cutter holders are opposed to each other. However, the lathe turning machine may have any configuration only if it can cut the workpiece and the respective positions of the first and second tools can be relatively shifted back and forth. The number of tools need not be limited to two, and the present invention may be applied to the control of lathe turning machines that each use three or more tools provided that the respective relative speeds and relative positions can be adjusted.

In the embodiment described above, the cutter holders fitted with the respective tools are configured to move individually to machine the workpiece. However, the technology of the present invention can also be applied to such a configuration that fixed and movable tools and a workpiece (or a spindle) move, for example.

The invention claimed is:

1. A numerical controller configured for simultaneous chip breaking and continuous cutting control such as to cut a workpiece in order in the direction of a rotary axis by a plurality of tools, in a machine having a plurality of cutter holders fitted individually with the tools and capable of lathe turning, the numerical controller comprising:
   an analyzer configured to generate movement command data for locating the plurality of tools so as to cut the workpiece with the same depth of cut and controlling respective relative speeds and relative positions of the plurality of tools so that respective cutting points of the tools move back and forth with respect to one another based upon the relative speeds of the tools, wherein:
   a feed speed of a first tool is different than a feed speed of a second tool, during the continuous cutting of the workpiece,
   the first tool is non-cutting when the feed speed of the first tool is less than the feed speed of the second tool, and the second tool is non-cutting when the feed speed of the second tool is less than the speed fee of the first tool, and
   a direction of cutting of the workpiece is the same for each of the tools;
   an interpolator configured to generate interpolation data based on the movement command data; and
   a servo controller configured to control a motor for driving the machine, based on the interpolation data.

2. The numerical controller according to claim 1, wherein the analyzer generates movement command data such that the respective relative speeds and relative positions of the plurality of tools are controlled so that the respective cutting points of the tools move back and forth in order when a preset condition is satisfied, and the condition is a cutting distance, time or the rotational frequency of a spindle.

3. The numerical controller according to claim 1, wherein the analyzer generates movement command data such that the respective relative speeds and relative positions of the plurality of tools are controlled so that the respective cutting points of the tools move back and forth in order when a preset condition is satisfied, and the condition is when a preset threshold is exceeded by the amplitude value of a vibration detected by a vibration sensor or the load value of a servomotor.

* * * * *